Patented June 4, 1935

2,003,374

UNITED STATES PATENT OFFICE 2,003,374

PREPARATION OF CALCIUM ACETYL-SALICYLATE

William H. Lawrence, Jr., Marblehead, Mass., assignor to Lee Laboratories, Incorporated, Cambridge, Mass., a corporation of Delaware No Drawing. Application July 21, 1932,
Serial No. 623,813

6 Claims. (Cl. 260—107)

This invention relates to improvements in methods of preparing the calcium salt of acetylsalicylic acid. The invention also contemplates a more stable calcium acetylsalicylate than has heretofore been prepared for commercial use.

The desirability of procuring aspirin in a more assimilable form has long been recognized by the medical profession. Aspirin itself is an insoluble acid and it frequently causes gastric disturbances in the stomach while, due to its insolubility, it is not so readily transmitted to the intestine as it might otherwise be; its desirable antipyretic and analgesic actions takes place after it has been attacked and absorbed by the alkaline media in the duodenal region of the digestive system.

Calcium acetylsalicylate or calcium aspirin is a water-soluble salt of aspirin having all the desirable therapeutic properties of aspirin with the added advantage of more ready assimilation by the digestive tract. This is due to its ready solution in aqueous media. For upwards of twenty years efforts have been made to supply this substance, but hitherto the calcium aspirin offered to the trade has been of small commercial or medicinal value because it has always been in a very unstable form, so that by the time it reached the consumer it was composed largely of calcium salicylate and/or salicylic acid, and contained but little calcium acetylsalicylate.

The necessity that calcium aspirin be reasonably stable so that it will withstand the exigencies of climate and storage on the part of the user, it will be appreciated when consideration is given to the effects of the decomposition of the salt. When aspirin and calcium aspirin decompose they form acetic acid and salicylic acid. Salicylic acid is insoluble in the aqueous acid media of the mouth and stomach, it is furthermore very acid and a relatively strong irritant of the walls of the stomach, and thus in the premature decomposition of aspirin or calcium aspirin a more irritating agent than aspirin itself is released.

Aspirin is reasonably stable, but calcium aspirin, as made heretofore, is exceedingly unstable and does not withstand ordinary storage conditions for any considerable length of time. The requirements of commercial and medicinal practices are such that for a drug of this nature to be really useful it must be capable of ordinary storage without material decomposition for upwards of six months or a year. The calcium aspirin as prepared by former methods has failed to meet these requirements.

It has been the theory that the instability of calcium aspirin has been due to the presence of the alkaline-earth, calcium, in the salt because it is thought that the calcium in the presence of moisture accelerates the hydrolysis of the salt and causes the consequent liberation of acetic and salicylic acids. Calcium aspirin as heretofore prepared has been hygroscopic and numerous efforts have been made to compound the salt with agents adapted to minimize or reduce its hygroscopicity. Again, in attempts to reduce the instability of the salt, dry preparations of aspirin and compounds of metals adapted to form soluble salts of aspirin in the presence of a solvent, have been compounded, but these have not found commercial application to any considerable extent.

The reaction involved in producing calcium aspirin is theoretically quite simple. Acetylsalicylic acid is combined with a calcium compound which has usually an alkaline reaction, to form directly the calcium salt of the acid. Prior art proposals comprise reacting a compound containing the radical of acetylsalicylic acid, such as the acid itself or an alkaline salt thereof, with a calcium compound, such as a salt or a calcium alcoholate. The tendency of calcium aspirin to hydrolyze in the presence of water has caused many prior investigators to avoid the presence of water or at least reduce the amount employed as much as possible. It has thus been proposed to effect these reactions by mixing solutions of the reagents in ethyl or methyl alcohol. Since alkali promotes hydrolysis in the presence of water, the use of calcium hydroxide as the source of the calcium is precluded, although attempts have been made to combine aspirin and calcium hydroxide in the presence of an organic solvent or aqueous solutions of common salt or calcium chloride. Another proposal consists in reacting a solution of aspirin in water with either a dry calcium compound or an aqueous solution of the latter, concentrating the mixture and permitting crystallization to take place assisted if desired by the addition of an organic precipitating agent. It has also been proposed to add dry calcium carbonate to a suspension of aspirin in water in the proportions of 1.2 and after filtering to precipitate the calcium aspirin by the addition of ethyl or methyl alcohol.

These prior attempts have failed entirely to produce a product which is acceptable to the medical profession, or a product which does not undergo spontaneous decomposition under ordinary conditions of storage in a relatively short length of time. These desiderata are achieved in accordance with this invention which is based upon the observation that the successful production of stable calcium aspirin is dependent upon various operating factors to which prior investigators paid little or no attention.

I have found that calcium aspirin, to be stable, should not contain any considerable quantity of iron compounds; it should have not more than 3.5 molecules of water calculated as water of crystallization; and it should be substantially free from calcium salicylate, calcium acetate, acetylsalicylic acid, magnesium acetylsalicylate, magnesium salicylate, ferric and ferrous acetate, salicylate or acetylsalicylate. The total iron content calculated as Fe should preferably be not more than 10 parts per million and it is desirably as low as 5 parts or less per million. I have found that if the product satisfies these specifications, it will meet the trade requirements as to stability, and it is more efficacious in use due to its greater resistance to decomposing influences of the upper part of the gastro-intestinal tract.

A product of this nature is secured by the careful practice of my improved method of manufacture, in which purity of the reagents, removal of decomposition products and accidental impurities, temperature control and freedom of the reagents to react with each other, play important parts.

The preferred reagents are substantially pure acetylsalicylic acid and precipitated chalk. Chalk is preferred to calcium hydroxide owing to the strong alkaline reaction of the latter tending to promote hydrolysis and thus decrease the yield. These reagents should contain as little iron, magnesium and other like impurities as possible. The removal of decomposition products and other undesirable impurities is effected by subjecting the product to the action of an agent adapted to dissolve or absorb the impurities and any excess water. Methyl alcohol or methanol is peculiarly adapted for this purpose and I have found that by repeatedly subjecting calcium aspirin to washings by or digestions in this solvent, a stable product is obtainable. Finally, in order that good yields may be secured it is necessary that the reagents have adequate freedom to react with each other. To this end water is used as the liquid medium assisted by continuous agitation. Yields, from 60% to over 80% of the theoretical yield, of a stable product assaying at 99.5% purity (calculated as $C_{18}H_{14}O_8$ Ca. 3.5 Aq.) are obtained.

Practical embodiments of the invention will now be disclosed in detail, by way of example.

*Example 1.*—500 grams of finely powdered acetylsalicylic acid and 160 grams of calcium carbonate (precipitated chalk), are intimately mixed and 3000 cc. of water is added. The mixture is stirred for 15 minutes or until the reaction is completed, which is indicated by the cessation of the liberation of carbon dioxide. The temperature is desirably maintained below 20° C. by any suitable cooling means. The mass is allowed to settle until the supernatant liquor is almost clear; this usually takes about 5 minutes, and the mixture is then filtered to remove unreacted material. This part of the process is carried out as quickly as possible so as to minimize any tendency of the calcium aspirin to hydrolyze in the solution. The filtrate is cooled to about 10° C. and 1 to 1½ volumes of 97% methanol, or pure wood alcohol is added. This causes the calcium aspirin to precipitate and the mass is then filtered to remove as thoroughly as possible the mother liquor. The residue of calcium aspirin is then suspended in a quantity of methanol equivalent to the volume previously used as a precipitant, and it is allowed there to stand for an hour or more with occasional or continuous agitation. The mass is again filtered, the filtrate being employed for the precipitation of calcium aspirin in a later batch. After the filtering of the first wash liquor, the calcium aspirin is again suspended in another quantity of methanol of an equivalent volume. This constitutes the second wash and it is carried out in same way as the first wash. The filtrate is employed as a first wash in a later batch and this filtrate in turn is used, as is the filtrate of the first wash, for the precipitation of more calcium aspirin. Fresh alcohol is used as a new wash in a later batch and the washes are carried out in series. After the second wash the calcium aspirin is dried in a suitable manner, as by passing dry warm air over it, the temperature not being allowed to rise to such an extent as to decompose the aspirin; preferably the temperature is not permitted to rise above 50° C., but should be high enough to avoid deposition of water vapor, and the drying is completed when there is no longer an odor of methanol.

*Example 2.*—As an alternative method of purifying the crude calcium aspirin which has been first precipitated with methanol the filter mass of the first precipitated calcium aspirin may be dissolved in sufficient cold water at about 10° C., filtered if necessary, from any slight insoluble material, and then precipitated with 1½ volumes of methanol, filtered, washed with a little 95% to 97% methanol and dried carefully at a suitable temperature. It may be found desirable to give the re-precipitated calcium aspirin one further digestion with 95% to 97% methanol to partly dehydrate as in Example 1.

*Example 3.*—The reaction of acetylsalicylic acid and calcium carbonate is carried out as in Example 1 and the water filtered off after completion of the reaction. The sediment is washed with about 250 cc. of water. In precipitating, 1½ volumes of methanol are added to the clear filtrate which is stirred until the calcium salt of the acetylsalicylic acid begins to separate out, and is then allowed to stand until the separation of the calcium salt is complete, the temperature being maintained below 20° C. The salt is then filtered and washed thoroughly with methanol. After being sucked free from mother liquor, it is spread on a filter paper and air-dried.

*Example 4.*—The reaction is carried out in accordance with Example 1, the calcium aspirin being precipitated with 1½ volumes of methanol, and is, after filtering removed from the filter and suspended in 2500 cc. methanol. After standing several hours, the calcium aspirin is removed by filtration and again suspended in 2500 cc. of fresh methanol for the same length of time. The calcium aspirin is then filtered off and dried until no odor of methanol remains.

*Example 5.*—The procedure is the same as for Example 4, except that three washes of 2500 cc. of methanol each are used instead of two washes. Different temperatures may be employed in the washings, the first wash being for 2 hours at 20° C., the second for 1 hour at 40° C., and the third for 1 hour at 70° C.

*Example 6.*—The reaction of acetylsalicylic acid and chalk is carried out in accordance with Example 3, up to the washing of the sediment with about 250 cc. of water. The volume of clear filtrate obtained should be 3700 cc. At this point the method for the precipitation of the calcium aspirin may be modified. The clear filtrate is chilled to 5° to 10° C. by the aid of an ice bath, brine coil or other refrigerating means. Then a volume of methanol, equal to the volume of filtrate, is added in a series of 10% portions (370 cc.) one 10% portion being added every 15 minutes with slow agitation.

The calcium aspirin starts to crystallize when approximately ¼ of the volume of methanol has been added. After 1 volume (3700 cc.) has been added, an additional half volume of methanol is added (1850 cc.). The mixture is then allowed to stand three hours for complete crystallization, the temperature being maintained between 5° and 10° C., this being considered important. The mixture is then filtered, washed and dried as set forth in the preceding examples. A yield of 515 grams of calcium aspirin containing 3½ molecules of water, and containing 85.8% of anhydrous calcium acetylsalicylate has been obtained. This is equal to a theoretical yield of 79.4%.

The crystals so obtained were more granular than those obtained by the previous experiments. They have an average length of 0.25 mm., a width of 0.112 mm. or larger.

A preferred form of procedure for the crystallization of my calcium aspirin, and one that lends itself best to a practical method is as follows: The aqueous solution of the calcium aspirin, after filtration from the excess of calcium carbonate and other insoluble substances, is chilled to 5° C. if it has not already been brought to this temperature. This solution is placed in a vessel capable of being maintained at a figure close to this temperature, and provided with slow means of agitation.

The required amount of methanol is then run in slowly and preferably during a period of about two hours. The agitation is so conducted as to barely keep the crystals of calcium aspirin in slow movement as they are formed. This combination of slow movement, slow addition of methanol, and low temperature, provides at once a large yield and relatively large crystals. Furthermore, the crystals are relatively thick for their length. This relationship of thickness to length provides an easy flowing crystalline powder.

It will be appreciated that these examples are susceptible of variation in respect of the various operating factors employed. A slight excess of pure calcium carbonate (usually about 10%) over the theoretical combining weight with acetylsalicylic acid is generally employed. Both the calcium carbonate and the acetylsalicylic acid are in a finely powdered state and they should both pass through a screen of 200 meshes to the linear inch. When the chalk and the aspirin are intimately mixed, the rate of reaction on moistening depends upon the fineness of the powders used. The finer the powder, particularly of the aspirin, the greater is the rate of reaction, while efficient stirring after the addition of the water enables the reaction to go to completion in a very short time. A smaller amount of water than the volume mentioned in the examples tends to decrease the yield since then much of the chalk and aspirin would be left in an uncombined state, or possibly calcium acetylsalicylate is thrown out of solution as formed. The reaction itself should be maintained at a temperature of not more than 20° C. During the reaction carbon dioxide is given off and a heavy foam containing chalk and aspirin is formed. This is broken by rapid stirring, and as a precaution, a small amount of ether may be added to break the foam. The reaction usually requires about 15 minutes for completion, while 5 minutes is generally sufficient to permit the mass to settle before filtering off the turbid supernatant liquor. While larger quantities of methyl alcohol or methanol than those specified in the examples, may be employed, I have found that the best results are secured with the use of 1½ volumes, as stated.

The apparatus employed should be free from iron, and the reaction is desirably effected in glass or enamel-lined vessels. If the process is carried out in accordance with these directions the product will not contain more than 10 parts of iron per million, and it is not difficult to reduce the iron content to less than 5 parts per million. The water of crystallization and any hygroscopic water similarly should not exceed 3½ molecules, and there will not be any measurable amount of undesirable impurities such as acetates, salicylates, salicylic or other free acids. The addition of a few drops of a 10% solution of ferric chloride to 300 or 400 milligrams of salt dissolved in 15 to 20 cc. of water will result in the precipitation of ferric acetylsalicylate as a light buff colored precipitate, and the absence of a purple color will show that the salt has not decomposed into salicylates.

The calcium aspirin obtained in accordance with this process is more stable than that produced by prior methods and is capable of ordinary storage without material decomposition for upwards of six months or a year. It may be compounded into tablet form for medicinal use by incorporation of the usual excipients, such as talc and starch. Furthermore, these tablets or pills may be provided with a binder consisting of a hard fatty substance such as one of the higher fatty acids, a glyceride of a higher fatty acid or a hydrogenated vegetable oil. Stearic acid, and hydrogenated cotton seed oil are examples of suitable binders and coating compositions which may be used to protect tablets of my calcium aspirin from excessive moisture during storage, and from the action of the upper part of the gastro-intestinal tract during administration of them as a medicine.

I claim:—

1. A process of preparing calcium acetylsalicylate which comprises intimately mixing precipitated chalk and finely powdered aspirin, adding water and stirring to complete the reaction at a temperature of not more that 20° C., filtering the supernatant liquor obtained on permitting the mass to settle, digesting the filtrate with a methanol-containing liquid, filtering off the precipitated calcium acetylsalicylate and digesting the residue with an agent which is a non-solvent for calcium acetylsalicylate but which is adapted to reduce the iron content to below 10 parts per million and to have a sufficient avidity for water to reduce the total water content to that of not more than three and one-half molecules when calculated as water of crystallization.

2. A process of preparing calcium aspirin which comprises intimately mixing precipitated chalk and finely powdered aspirin, adding water and stirring to complete the reaction at a temperature of not more than 20° C., filtering the supernatant liquor obtained on permitting the mass to settle, digesting said liquor with one and one-half volumes of methanol, filtering off the precipitated calcium aspirin and digesting it with methanol until the iron content is not more than 10 parts per million, and finally drying at a temperature of not more than 50° C.

3. A process of preparing calcium acetylsalicylate which comprises intimately mixing precipitated chalk and finely powered acetylsalicylate, adding water to the mixture in an amount equal to about six times the total weight of the acetylsalicylate, permitting the reaction to proceed to completion at a temperature of not more than 20° C., permitting the mixture to settle, filtering the supernatant liquor, digesting the filtrate with methanol, filtering off the precipitated calcium acetylsalicylate, washing the residue with methanol, repeating said washing with fresh methanol, and finally drying at a temperature or not over 50° C.

4. A process of preparing calcium acetylsalicylate which comprises intimately mixing precipitated chalk and finely powdered acetylsalicylate, adding water to the mixture in an amount equal to about six times the total weight of the acetylsalicylate, permitting the reaction to proceed to completion at a temperature of not more than 20° C. permitting the mixture to settle, filtering the supernatant liquor, cooling the filtrate to about 5° to 10° C., digesting the filtrate with methanol by adding amounts of methanol equal to one-tenth the volume of the filtrate while slowly agitating the resulting mixture until the total amount of methanol added is equal to the volume of the original filtrate, adding a further amount of methanol equal to one-half the volume of the original filtrate, permitting the mixture to stand for several hours and maintaining the temperature thereof at between 5° and 10° C., filtering off the crystals of calcium acetylsalicylate precipitated in the filtrate, and washing and drying said crystals.

5. A process of preparing calcium acetylsalicylate which comprises intimately mixing precipitated chalk and finely powdered acetylsalicylate, adding water to the mixture in an amount equal to about six times the total weight of the acetylsalicylate, permitting the reaction to proceed to completion at a temperature of not more than 20° C., permitting the mixture to settle, filtering the supernatant liquor, digesting the filtrate with methanol, filtering off the precipitated calcium acetylsalicylate, redissolving the filtered calcium acetylsalicylate in a small volume of water, reprecipitating the calcium acetylsalicylate with methanol, filtering off the resulting precipitate, washing the precipitate with methanol, and drying at a low temperature.

6. A process of stabilizing crude calcium acetylsalicylate which comprises dissolving the same in a sufficient quantity of cold water at about 10° C., digesting the resulting solution with 1½ volumes of methanol, filtering out the resulting precipitated crystals of calcium acetylsalicylate, washing the crystals with methanol, and drying the crystals at a temperature of not over 50° C.

WILLIAM H. LAWRENCE, Jr.